United States Patent [19]

Lukis et al.

[11] Patent Number: 4,493,104
[45] Date of Patent: Jan. 8, 1985

[54] CHARACTER RECOGNITION DEVICE

[75] Inventors: Lawrence J. Lukis, Grand Island, N.Y.; Gerard P. Duhig, London, England

[73] Assignee: Moore Business Forms, Inc., Grand Island, N.Y.

[21] Appl. No.: 329,807

[22] Filed: Dec. 11, 1981

[51] Int. Cl.³ .............................................. G06K 9/28
[52] U.S. Cl. ...................................... 382/13; 178/18; 382/59
[58] Field of Search ............... 178/18, 19, 20; 382/13, 382/3, 59

[56] References Cited

U.S. PATENT DOCUMENTS

| | | | |
|---|---|---|---|
| 3,624,619 | 11/1971 | Ambrosio | 178/18 |
| 3,911,215 | 10/1975 | Hurst et al. | 178/18 |
| 4,054,540 | 10/1977 | Michalchik | 252/511 |
| 4,079,194 | 3/1978 | Kley | 178/18 |
| 4,262,281 | 4/1981 | Buckle et al. | 382/13 |
| 4,455,450 | 6/1984 | Margolin | 178/18 |

FOREIGN PATENT DOCUMENTS 1331942  8/1973  United Kingdom ................. 178/18

Primary Examiner—Leo H. Boudreau
Attorney, Agent, or Firm—Allegretti, Newitt, Witcoff & McAndrews, Ltd.

[57] ABSTRACT

This invention is concerned with a character recognition device which includes a writing pad having a pair of sheets with one of the sheets comprising an area of high resistivity and the other one of the sheets comprising a layer of conductive material, the sheets being normally electrically insulated from one another but adapted to be brought into contact with one another by application of writing pressure by a writing implement upon the writing pad, the sheets being adapted to be connected to an electrical switching circuit whereby current is caused to flow through the pad along two alternate paths, wherein the high resistivity and the conductive sheet are separated by a layer of reticulated material and the conductive material is sufficiently elastomeric to provide good continuous electrical contact between the sheets when writing pressure is applied.

6 Claims, 6 Drawing Figures

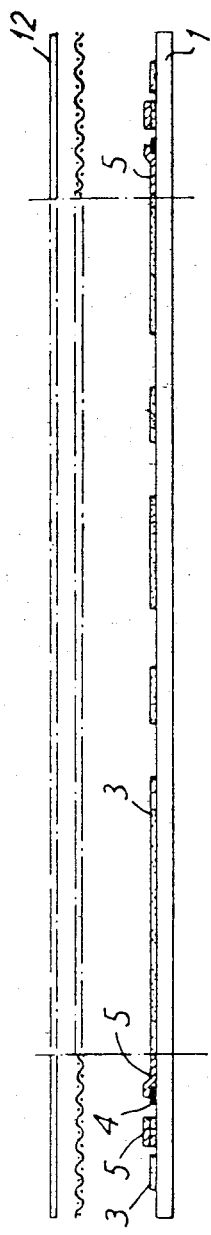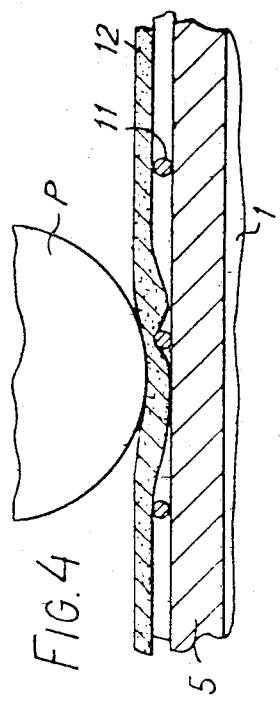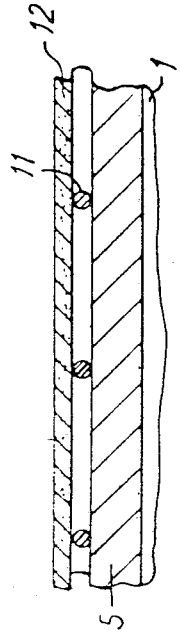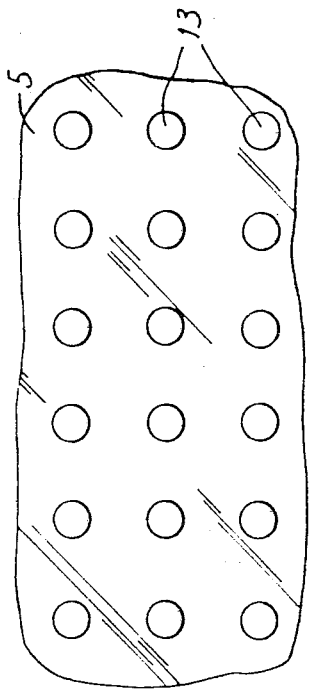

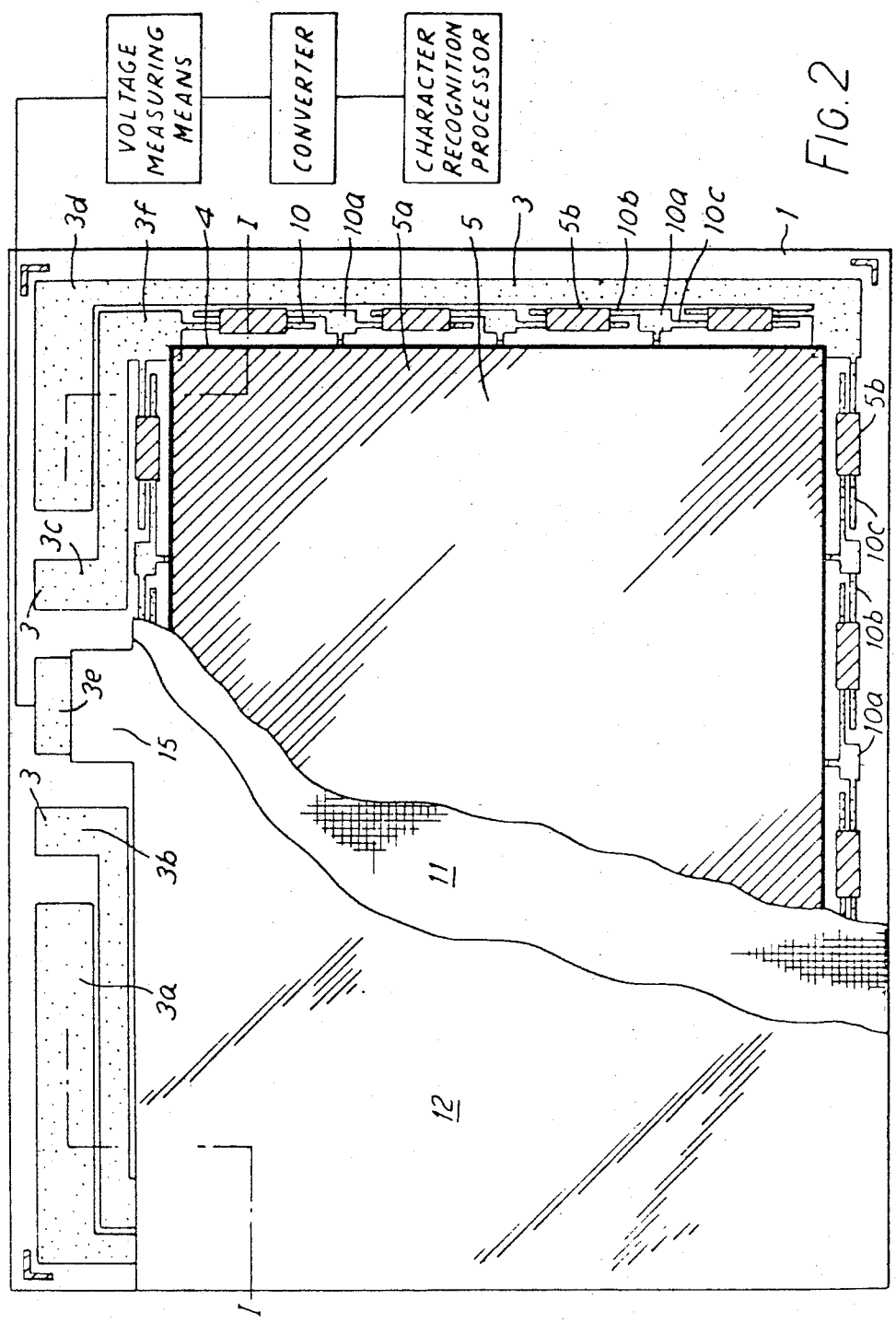

CHARACTER RECOGNITION DEVICE

BACKGROUND OF THE INVENTION

Field of the Invention and Description of the Prior Art

This invention has reference primarily but not exclusively to character recognition devices and more particularly to such character recognition devices which are utilized to recognize characters as the characters are written by hand.

Thus, there is described in British Patent Specification No. 868431 apparatus for automatically recording hand written characters, comprising a support surface and an electrical control circuit activated by changes in direction of a writing instrument as it moves over the supporting surface.

Furthermore, in British Specification Nos. 588043 and 1310683, there is described a writing pad comprising electrical supply and sensing circuits and a pair of sheets one of which has a resistive circuit, which sheets are moved into contact with one another by a writing implement whereby electrical potentials are applied to the surfaces and output potentials related to the position at which the two sheets contact one another are generated.

In U.S. Pat. No. 3,885,097, there is described a writing pad having two spaced apart sheets of resistive material which sheets are spaced apart by a mechanical separator such as a woven nylon cloth to prevent contact between the sheets when an operator's hand rests on the top sheet.

It is found that such writing pads suffer from the disadvantage that either electrical contact is made between the two sheets if an operator's hand is laid on the top sheet, or, alternately, effective electrical contact is not made between the two sheets throughout the whole length of a writing stroke.

SUMMARY OF THE INVENTION

It is an object of the present invention to provide an improved character recognition apparatus and in particular to provide an improved writing pad for use in such character recognition apparatus.

It is a further object of the present invention to provide a writing pad in which no electrical contact is made between the sheets thereof if an operator's hand is laid on the writing pad, but effective electrical contact is made between the sheets through the whole length of a writing stroke.

Further purposes and objects will appear as the specification proceeds.

According to the present invention, a character recognition device comprising a writing pad having a pair of sheets, one of the sheets comprising an area of high resistivity and the other one of the sheets comprising a layer of conductive material, the sheets being normally electrically insulated from one another but are adopted to be brought into contact with one another by application of writing pressure by a writing implement upon the writing pad, the sheets being adapted to be connected to an electrical switching circuit, whereby current is caused to flow through the pad along two alternate paths, and to a recognition circuit to recognize written characters by virtue of the changes in electrical voltages in the alternate paths, characterized in that the high resistivity sheet and the conductive sheet are separated by a layer of reticulated material and the conductive material is sufficiently elastomeric to provide good continuous electrical contact between sheets when writing pressure is applied.

BRIEF DESCRIPTION OF THE DRAWINGS

Character recognition apparatus, including a writing pad, in accordance with the present invention will now be described by way of example with reference to the accompanying drawings wherein:

FIG. 1 is a diagrammatic cross-sectional view of the writing pad taken on the line I—I FIG. 2;

FIG. 2 is a cut away view of the writing pad;

FIGS. 3 and 4 are enlarged diagrammatic views of a contact point between the sheets of the writing pad; and FIGS. 5 and 6 are further enlarged diagrammatic views of alternate arrangements.

DETAILED DESCRIPTION OF THE PREFERRED EMBODIMENTS

Figure 5:
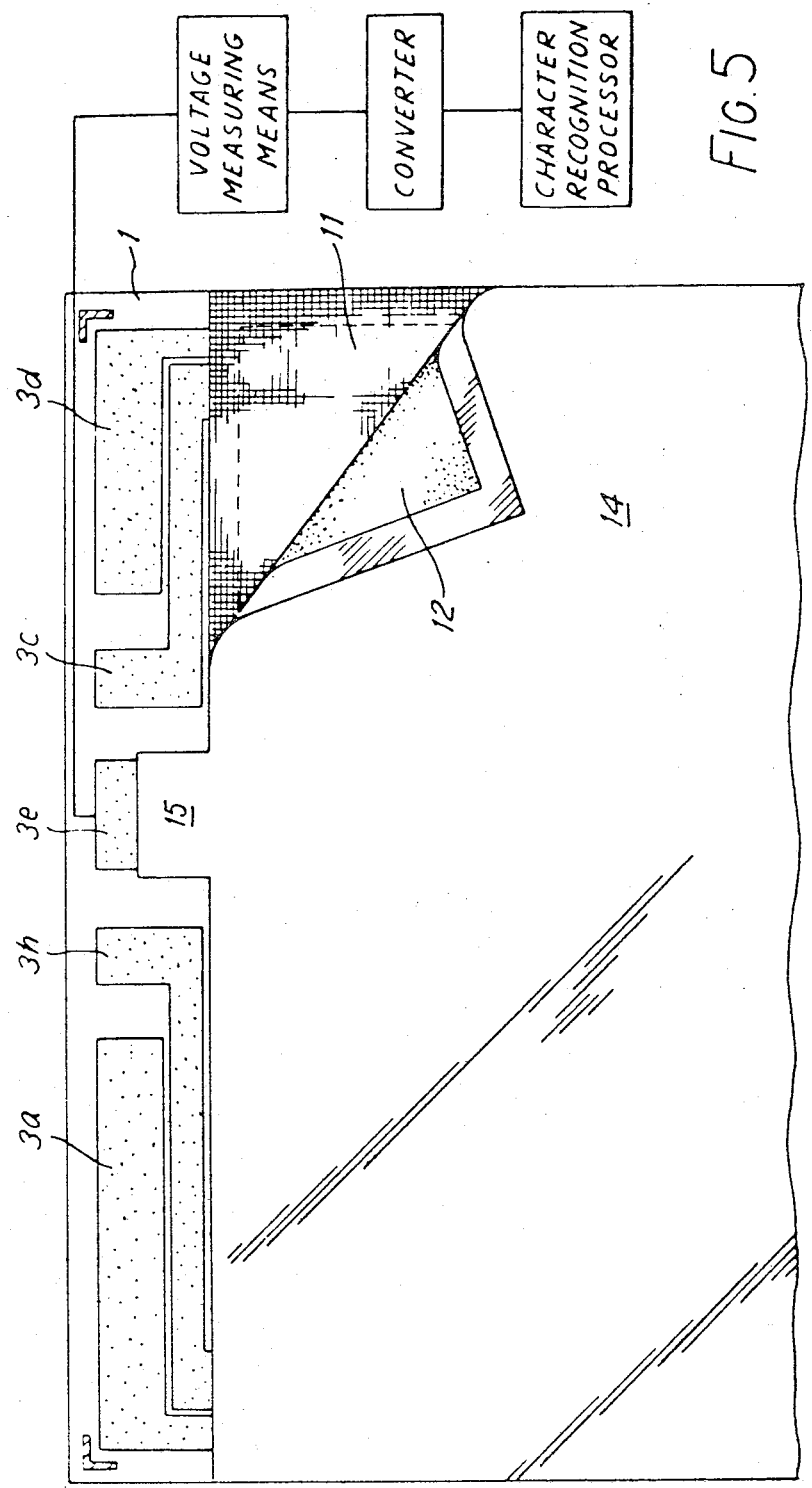

Referring to the drawings there is shown in FIGS. 1 and 2 a writing pad including a rigid base board 1 of non-conducting material (such as the material known as fibreglass) which serves as the mechanical supporting part of the writing pad.

A layer of conductive connector material 3 is printed on the base board 1. The material of the conductive connector layer is applied in the form of an etched copper layer similar to that used on printed circuit boards or may be applied as an ink which embodies silver particles to provide a coating having a resistance of about 0.01 ohms per square area (and hereinafter referred to as a low resistance). The conductive connector coating 3 serves to connect the medium resistance borders 4 to be hereinafter described) to printed connectors 3a, 3b, 3c, 3d, 3e at the top edge as shown in FIG. 2 to connection to external electric circuits.

Printed on top of the low resistance conductive connector layer 3 is a medium resistance border layer 4 which extends completely around the periphery of a higher resistance coating layer 5 (to be hereinafter described). The medium resistance layer 4 overlaps the low resistance layer 3 at the corners thereof. The medium resistance border layer has a thickness of between one thousandth and three thousandth of an inch (0.001" to 0.003") and may be printed from ink embodying a mixture of silver and carbon particles to give a resistance of the order of one ohm per square area. This medium resistance layer 4 is shown in black on FIG. 2 of the drawings.

The higher resistance coating 5 which has a resistance of about 1000 ohms per square area may be printed from an ink having conducting material (preferably carbon or silver) and a resin, a plasticizer and a solvent. This coating has a thickness of about 0.001 to 0.003".

The low resistance conductive connector layer 3 comprises a series of connector areas 3a, 3b, 3c, 3d, 3e arranged at the top edge of the writing pad as shown in FIG. 2, to an external circuit. As shown the connector areas 3a, 3b, 3c, 3d, 3e are positioned at the end of a conductive lead to a rectangular area 3f adjacent each corner of the high resistance area. These connections are made from the connectors 3a, 3b, 3c, 3d, to the rectangular corner areas 3f adjacent the respective four corners of the rectangular resistive part 5a two of which corners are shown in FIG. 2. Additional areas of the conductive connector coating 3 are provided in the form of a series of extension lines 10 extending outwardly from one of the respective corner areas 3c and from beneath the medium resistance border layer 4. These extension lines 10 like the remainder of the low resistance layer 3 are printed to form part of the low resistance layer 3 and are preferably of silver ink. The extension lines 10 each consist of a rectangular part 10a with one line 10b extending from the rectangular part 10a in one direction and a second line 10c extending from the rectangular part 10a in the opposite direction.

Each outer line 10c extends parallel to and outwardly of the line 10b extending from the next adjacent part 10a. The extension lines 10a, 10c are overlaid by the tuning rectangular parts 5b which form part of the high resistive coating 5. The higher resistance coating 5 is printed on the board shown in FIG. 2 mainly within the border formed by the border layer 4 but partially overlies the border layer 4. The main part of the high resistance coating layer 5 comprises a main rectangular part 5a lying within the border layer 4. The other part of the high resistance coating layer also shown in FIG. 2 of the drawings in hatching comprises a plurality of tuning rectangular parts 5b arranged outside the border layer 4 and which serve to give the coating layer 5 the property of linear drop in voltage when appropriately driven.

Extension lines 10b, 10c are intended to be used to ensure that with the selective adjustments to the resistivity of the border areas the effective resistance of the border areas 4 and the extension lines 10b, 10c serves to modify the resistivity of the resistive part 5a and thus the voltage gradient along the length of the pad is linear when connected in an electrical circuit. This is achieved by removing material from the parts 5b which falls between the adjacent lines 10b, 10c parallel with one another or if appropriate removing part of a line 10b or 10c to place the tuning rectangular part 5b on open circuit.

Each one of the resistive layer 5 and the border layer 4 are formed by screen printing on the sheet 2. The layers have a thickness of about 0.001" or even less.

Positioned above the resistive layer 5 and separate therefrom is a volume conductive elastomeric layer 12 which for example has a thickness of 0.003"–0.020." Elastomeric, by definition, means formed of elastomer. Elastomer, by definition, means natural or synthetic rubber. The layer contains a conductive material typically carbon or nickel. The elastomeric layer 12 has an electrical resistance of about 100,000 ohms per square but less than 100 ohms per square when depressed. The layer 12 is connected by an integral electric connection through a tab part 15 on the layer 12 and a connection area 3e at the top edge of the writing pad to make a permanent electrical connection to an external electric circuit including voltage measuring means. The voltage measuring means is in turn connected through a connector circuit to a character recognition processor. Such circuits are described in European Patent Specification Nos. 0032013 and 0032619. The elastomeric layer may be the material described in the Specification of U.S. Pat. Nos. 4,054,540 and 4,120,828.

An electrical switching circuit is provided whereby an electrical voltage is connected alternately between the connectors 3a, 3b and the connectors 3c, 3d on the one hand and connectors 3a 3d and 3b, 3c and voltage measuring means on the other hand. Such circuits are described in European Patent Specification Nos. 0032103 and 0032619.

An insulating stilt layer 11 is positioned between the resistive layer 5 and the elastomeric layer 12 normally to retain the two layers apart. This stilt layer comprises a layer of reticulated material with the openings in the layer of a width of between 0.005" and 0.10".

The layer 11 may comprise a knitted fabric or a lattice sheet of thermoplastics material of small thickness typically having a thickness (say less than 0.005") of less than 20% of the size of the distance across the reticules in the fabric or lattice work. The thickness of the elastomeric layer 12 should be at least twice the thickness of the reticulated material layer 11. The thickness and size of the reticules in the reticulated material and the elasticity of the elastomeric material should be such that when writing pressure is applied to the elastomeric sheet through a sheet of writing paper or the like the elastomeric layer makes contact with the resistive layer 5 through the reticules of the reticulated layer. Moreover as the writing pen or the like moves over the elastomeric sheet an electrical contact on one side of a transverse thread or the like of the reticulated layer 11 is maintained at least until electrical contact on the other side of the transverse thread is made thus maintaining good electrical contact during a writing operation.

Thus as shown in FIGS. 3 and 4 of the drawings there is shown the base board, with the coating layer 5 with the stilt reticulated layer 11 represented by threads of a knitted fabric between the coating layer 5 and the elastomeric layer 12.

In FIG. 3 the layers are shown in the non writing position but in FIG. 4 a pen P is applied to the elastomeric layer which is distorted so as to extend through the reticules in the reticulated layer 11 into contact with the resistive layer 5. The elastomeric material of the layer 12 is sufficiently elastic to extend simultaneously through two reticules into contact with the resistive layer. By this means as the pen moves over the surface of the elastomeric layer good electrical contact adjacent the writing position is maintained between the elastomeric layer and the writing layer.

If desired a protective layer of thermoplastic polyester film for example known as MYLAR or MELINEX film and having a thickness of from 0.001" to 0.005" is provided over the elastomeric layer. This protective layer is flexible to enable writing to take effect through the layers.

In an alternative embodiment a high conductive layer may be screen printed on the lower face of the protective polyester film. This is provided to reduce the conductivity required in the elastomeric layer 12.

In a further embodiment shown in FIG. 5 there is provided a resistive layer on a base board similar to that shown in FIGS. 1 and 2. Above the resistive layer is located a reticulated layer of FIGS. 1 and 2 but this layer 11 has some flexibility. Above this reticulated layer 11 is a conductive layer 12 which in turn is covered by a protective layer 14. The conductive layer 12 and the protective layer 14 are both required to be flexible, so that with the flexibility of the reticulated layer the layers permit deformation under writing pen pressure so that the elastomeric layer 12 is pressed through the reticulated layer to make an electrical connection with the resistive layer.

A tab part 15 is formed on each of the elastomeric layer 12 and the protective layer 14 to provide a permanent electrical connection between the connector area 6 and at the top edge of the writing pad to an external electrical circuit.

As shown, the reticulated layer 11 of a thermoplastics material is welded to the protective layer 14 which is also of a thermoplastic material around the periphery of the layers and the elastomeric layer is trapped and located between the reticulated layer 11 and the protective layer 14.

It is considered that the various layers of elastomeric layer, conductive layer, reticulated layer and protective layer should be in the form of a laminate which may be disposable.

It is still a further embodiment as shown diagramatically in FIG. 6 a base board with a high resistive coating layer 5 with the conductive layer border layer and the extension lines (not shown) has a series of insulating "islands" 13 formed on the high resistance coating layer 5 to constitute the reticulated layer. These insulating islands 13 are high enough (typically between 0.001" and 0.005") to retain the conductive sheet out of contact with the coating layer 5 but not to prevent the conductive elastomeric layer providing good electrical contact with the coating layer 5 when writing pressure is applied.

The islands 13 are formed by coating a base board 1 having the high resistance coating layer and the conducting layer 3 etc with an emulsion coating of the kind used as a screen printing emulsion. The coating has a thickness of between 0.001" (one thousandth of an inch) and 0.005" (five thousandths of an inch). The emulsion coating is subjected to light through a screen tint screen representing a 5% screen that is to say a screen having a series of spaced holes (corresponding to the islands 13 of FIG. 5) with the holes spaced about 0.007" (seven thousandths of an inch) apart and with the holes 0.002" (two thousandths of an inch) in diameter.

The light has the effect of hardening parts of the emulsion corresponding to the holes to harden the emulsion to make these corresponding parts insoluble. The emulsion layer is then washed to remove these parts of the layer not effected by light to leave the islands on the coating layer 5.

While in the foregoing, there has been provided a detailed description of preferred embodiments of the present invention, it is to be understood that all equivalents obvious to those having skill in the art are to be included within the scope of the invention as claimed.

What we claim is:

1. A character recognition device comprising a writing pad having a pair of sheets and a layer of reticulated material with reticules, one of the sheets comprising an area of high resistivity and the other one of the sheets comprising a layer of conductive material, the sheets being normally electrically insulated from one another while being constructed and arranged to be brought into contact with one another by application of writing pressure by a writing implement upon the writing pad, the sheets being adapted to be connected to an electrical switching circuit whereby current is caused to flow through the pad along two alernate paths and to a recognition circuit to recognize written characters by virtue of the change in electrical voltages in the alternate paths, the high resistivity sheet and the conductive sheet being separated by the layer of reticulated material and the conductive material being elastomeric and being sufficiently elastic to deform through the reticules of the reticulated material to provide continuous electrical contact between the sheets through the whole length of a writing stroke with said writing implement.

2. A character recognition device according to claim 1 wherein a protective layer of thermoplastic film is provided to protect the elastomeric layer.

3. A character recognition device according to claim 1 wherein the reticulated material is a layer of knitted fabric.

4. A character recognition device according to claim 1 wherein the reticulated material is a lattice sheet of small thicknesses of thermoplastic material.

5. A character recognition device comprising a writing pad having a pair of sheets, one of the sheets comprising an area of high resistivity and the other one of the sheets comprising a layer of conductive material, the sheets being normally electrically insulated from one another while being constructed and arranged to be brought into contact with one another by application of writing pressure by a writing implement upon the writing pad, the sheets being adapted to be connected to an electrical switching circuit whereby current is caused to flow through the pad along two alternate paths and to a recognition circuit to recognize written characters by virtue of the change in electrical voltages in the alternate paths, the high resistivity sheet and the conductive sheet being separated by a layer of reticulated material, the conductive material is sufficiently elastomeric to provide continuous electrical contact between the sheets when writing pressure is applied, and a protective layer of thermoplastic film for protecting said elastomeric conductive material, said layer of reticulated material being welded to said protective layer around the periphery of the layers, the elastomeric conductive material layer being trapped between the reticulated layer and the protective layer.

6. A character recognition device comprising a writing pad having a pair of sheets, one of the sheets comprising an area of high resistivity and the other one of the sheets comprising a layer of conductive material, the sheets being normally electrically insulated from one another while being constructed and arranged to be brought into contact with one another by application of writing pressure by a writing implement upon the writing pad, the sheets being adapted to be connected to an electrical switching circuit whereby current is caused to flow through the pad along two alternate paths and to a recognition circuit to recognize written characters by virtue of the change in electrical voltages in the alternate paths, the high resistivity sheet and the conductive sheet being separated by a layer of reticulated material, the conductive material being sufficiently elastomeric to provide continuous electrical contact between the sheets when writing pressure is applied, said reticulated material being a lattice sheet of small thickness of thermoplastic material, said layer of reticulated material being welded to the protective layer around the periphery of the layer, said elastomeric conductive layer being trapped between the reticulated layer and the protective layer.

* * * * *